United States Patent
Yamada et al.

(10) Patent No.: US 11,312,220 B2
(45) Date of Patent: Apr. 26, 2022

(54) BATTERY UNIT MOUNTING STRUCTURE OF ELECTRIC VEHICLE

(71) Applicant: MAZDA MOTOR CORPORATION, Hiroshima (JP)

(72) Inventors: Morihide Yamada, Hiroshima (JP); Kazuhisa Hatano, Hiroshima (JP); Hisashi Akune, Aki-gun (JP); Munenari Takahashi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 67 days.

(21) Appl. No.: 16/817,855

(22) Filed: Mar. 13, 2020

(65) Prior Publication Data

US 2020/0376947 A1    Dec. 3, 2020

(30) Foreign Application Priority Data

May 30, 2019  (JP) .............................. JP2019-101631
Jan. 9, 2020   (JP) .............................. JP2020-002150

(51) Int. Cl.
*B60K 1/04*    (2019.01)
*B60R 16/04*   (2006.01)
*H01M 50/20*   (2021.01)

(52) U.S. Cl.
CPC ............... *B60K 1/04* (2013.01); *B60R 16/04* (2013.01); *H01M 50/20* (2021.01); *B60K 2001/0438* (2013.01); *H01M 2220/20* (2013.01)

(58) Field of Classification Search
CPC ............................................ B60K 2001/0438
See application file for complete search history.

(56) References Cited

U.S. PATENT DOCUMENTS

2009/0197154 A1   8/2009  Takasaki et al.
2011/0297467 A1*  12/2011 Iwasa .................. B60K 1/04
                                                    180/65.31
(Continued)

FOREIGN PATENT DOCUMENTS

EP    2 620 353 A1    7/2013
EP    3 412 486 A1   12/2018
(Continued)

OTHER PUBLICATIONS

The extended European search report issued by the European Patent Office dated Sep. 25, 2020, which corresponds to European Application No. 20175659.0-1012 and is related to U.S. Appl. No. 16/817,855.

*Primary Examiner* — Brian L Swenson
(74) *Attorney, Agent, or Firm* — Studebaker & Brackett PC

(57) ABSTRACT

There are provided a floor panel, a pair of right-and-left floor frames, and a battery unit supporting a battery module and mounted at the floor frames. The battery unit comprises the battery module, a pair of right-and-left side frames mounted at the pair of floor frames, and a pair of front-and-rear module supporting mechanisms which comprises a pair of front-and-rear cross frames respectively extending in a vehicle width direction and interconnecting the pair of side frames and mounting brackets supporting a front end portion and a rear end portion of the battery module. Bending rigidity, in a vertical direction, of the module supporting mechanism comprising the third cross frame and the first mounting bracket is set to be lower than that of the side frame.

5 Claims, 12 Drawing Sheets

(56) References Cited

U.S. PATENT DOCUMENTS

| | | | |
|---|---|---|---|
| 2012/0097466 A1* | 4/2012 | Usami | B60K 1/04 180/68.5 |
| 2012/0169089 A1 | 7/2012 | Rawlinson et al. | |
| 2012/0321927 A1* | 12/2012 | Loo | H01M 50/20 429/100 |
| 2013/0229030 A1* | 9/2013 | Yamaguchi | B60L 50/66 296/193.07 |
| 2016/0375750 A1* | 12/2016 | Hokazono | B62D 25/2036 180/68.5 |
| 2017/0001507 A1* | 1/2017 | Ashraf | B62D 25/2036 |
| 2018/0126857 A1* | 5/2018 | Kelly-Morgan | B60L 50/51 |

FOREIGN PATENT DOCUMENTS

| | | |
|---|---|---|
| JP | H05016674 A | 1/1993 |
| JP | 2004359176 A | 12/2004 |

* cited by examiner

BATTERY UNIT MOUNTING STRUCTURE OF ELECTRIC VEHICLE

BACKGROUND OF THE INVENTION

The present invention relates to a battery unit mounting structure of an electric vehicle comprising a battery unit supporting a battery module and mounted at a pair of floor frames.

Conventionally, it is known that vibration energy caused by a wheel running on a road surface is transmitted to a vehicle-body strength member through a suspension member and then vibrates a panel member, such as a floor panel forming a cabin, in a vehicle steady traveling. Thereby, traveling noises, such as drumming noise or road noise, are generated. The drumming noise is a low-frequency sound of 20-50 Hz, and the road noise is a middle-frequency sound of 100-400 Hz. The drumming noise is sometimes called the road noise. These traveling noises, including the drumming noise and the road noise, may be suppressed by adding a damping material or increasing rigidity of a lower vehicle-body.

A heavy unit supporting structure of an automotive vehicle disclosed in Japanese Patent Laid-Open Publication No. 2004-359176 comprises a bead which is formed at a surface of a battery tray mounting a battery as a heavy object. Thereby, a contact position of the battery and the battery tray can be set at a specified location regardless of a shape of the battery or the like, so that improper resonance (sympathetic vibration) of the battery and the battery tray can be suppressed easily. A battery supporting structure of an electric automotive vehicle disclosed in Japanese Patent Laid-Open Publication No. H5-016674 is configured such that a battery is supported at a vehicle body via plural resilient members, wherein the direction and the frequency of vibration generated at the vehicle body are set to be nearly equal to those of the vibration generated at the battery. Thereby, a phase of the vibration generated at the vehicle body is made inverse to that of the vibration generated at the battery, so that the vehicle-body vibration is suppressed.

In the electric vehicle provided with the battery unit, since the battery unit is considerably heavy, it is concerned that the battery unit resonates with the vehicle body at a specified frequency band, so that the traveling noises may be generated greatly. Then, a simulation analysis with the CAE (Computer Aided Engineering) was conducted for clarifying relationships between the battery unit and the traveling noises. A vehicle model A (evaluation standard model) where the battery unit was not mounted and a vehicle model B which was designed similarly to the model A except the battery unit were prepared, and respective vehicle-body vibrations of the models A, B at each frequency band were calculated. Herein, the total weight of the battery unit was 300 kg, and sixteen battery modules which had the same shape and were aligned in the same position were firmly supported. Further, the ERP (Equivalent Radiation Energy) corresponding to a radiated sound power was calculated from a displacement of each node of the respective models as an evaluation index of the vehicle-body vibration.

Its analysis results will be explained referring to FIG. 15. As shown by a broken line in FIG. 15, it was found regarding the model B provided with the battery unit that the low-frequency traveling noises were generated at the frequency band around 40 Hz, so that the drumming-noise performance deteriorated, compared to the model A provided with no battery unit which is shown by a solid line. The inventors of the present invention found that the vertical move of the battery module occupying most of the weight of the battery unit resonated with the vertical vibration of the vehicle-body-side frame, thereby causing the low-frequency vehicle-body bending move. That is, the resonance tendency of the vehicle-body-side frame increased as the mounting rigidity of the battery module became higher. Accordingly, it was not easy to compatibly ensure the mounting rigidity of the battery module and achieve reduction of the traveling noises.

SUMMARY OF THE INVENTION

Accordingly, an object of the present invention is to provide a battery unit mounting structure of an electric vehicle which can properly reduce the traveling noises, ensuring the mounting rigidity of the battery module.

The present invention is a battery unit mounting structure of an electric vehicle, comprising a floor panel, a pair of right-and-left floor frames provided below the floor panel, each of which forms a closed-cross section extending longitudinally cooperatively with the floor panel, and a battery unit supporting a battery module and mounted at the pair of floor frames, wherein the battery unit comprises the battery module, a pair of right-and-left side frames mounted at the pair of floor frames, and a pair of front-and-rear module supporting mechanisms which include a pair of front-and-rear cross frames respectively extending in a vehicle width direction and interconnecting the pair of side frames and support a front end portion and a rear end portion of the battery module, and bending rigidity, in a vertical direction, of the module supporting mechanism is set to be lower than that of the side frame.

According to the present invention, since the battery unit comprises the battery module, the pair of right-and-left side frames mounted at the pair of floor frames, and the pair of front-and-rear module supporting mechanisms which include the pair of front-and-rear cross frames respectively extending in the vehicle width direction and interconnecting the pair of side frames and support the front end portion and the rear end portion of the battery module, the battery module can be firmly connected to the vehicle-body-side floor frames via the side frames. Further, since the bending rigidity, in the vertical direction, of the module supporting mechanism is set to be lower than that of the side frame, the vertical move of the side frame and the vertical move of the battery module can be separated (independent) from each other, so that the resonance, in the vertical direction, of the vehicle body and the battery unit can be suppressed.

In an embodiment of the present invention, bending rigidity, in the vertical direction, of the cross frame is set to be lower than that of the floor frame, and the bending rigidity, in the vertical direction, of the module supporting mechanism is set to be 25% of the bending rigidity, in the vertical direction, of the side frame or lower.

According to this embodiment, the weight reduction and improvement of the vibration characteristic (performance) can be compatibly achieved.

In another embodiment of the present invention, the module supporting mechanism comprises a mounting bracket to mount the battery module at the cross frame vertically movably (i.e., in such a manner that the battery module can be vertically displaced), and bending rigidity, in the vertical direction, of the mounting bracket is set to be lower than that of the cross frame.

According to this embodiment, the bending rigidity, in the vertical direction, of the module supporting mechanism can be set to be lower than that of the side frame, without decreasing the rigidity of the cross frame.

In another embodiment of the present invention, the mounting bracket comprises a connecting wall portion extending in the vertical direction and connected to the battery module and a fixing wall portion extending in an opposite direction to the battery module from a lower end part of the connecting wall portion and fixed to an upper wall portion of the cross frame, and the fixing wall portion of the mounting bracket is configured to protrude toward the battery module from the upper wall portion of the cross frame.

According to this embodiment, the vertical move of the cross frame and the vertical move of the battery module can be separated (independent) from each other, synchronizing the move, in the vehicle width direction, of the cross frame and the move, in the vehicle width direction, of the battery module with a simple structure.

In another embodiment of the present invention, the battery unit comprises a battery tray which is supported at the side frame and forms a bottom portion of the battery unit.

According to this embodiment, the battery module can be mounted at the battery tray vertically movably.

The present invention will become apparent from the following description which refers to the accompanying drawings.

DETAILED DESCRIPTION OF THE INVENTION

Figure 1:
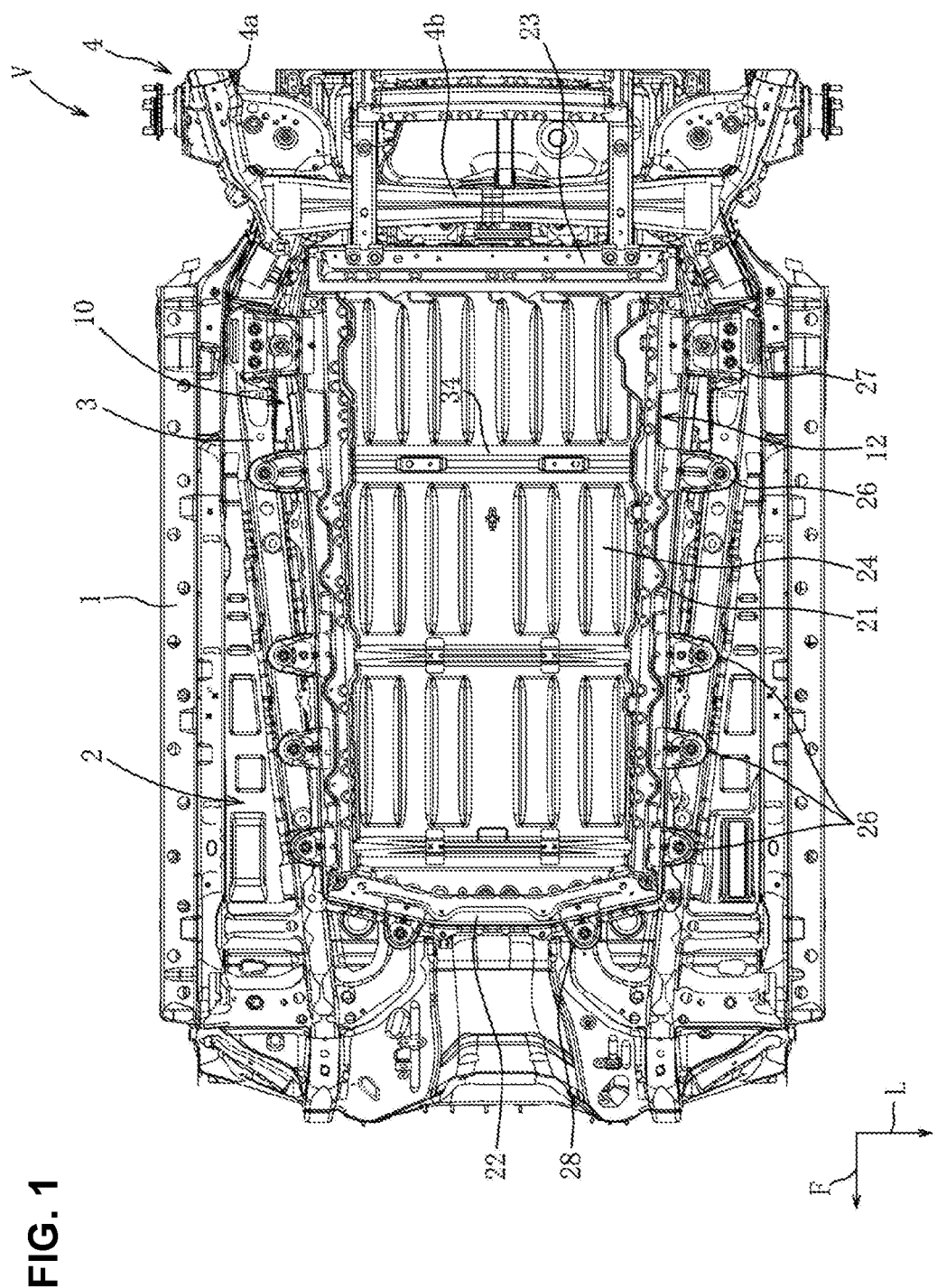
FIG. 1 is a bottom view of an electric vehicle according to an embodiment.

Hereafter, an embodiment of the present embodiment will be described referring to the drawings. The flowing description of the embodiment merely exemplify the present invention substantially, and therefore the present invention and its applications or uses should not be limited by the following description.

The embodiment of the present invention will be described referring to FIGS. 1-14. A vehicle V according to the present embodiment is a hybrid automotive vehicle provided with a driving source which combines an internal combustion engine (not illustrated), such as a gasoline or diesel engine and an electric motor (motor generator) for vehicle driving.

Figure 2:
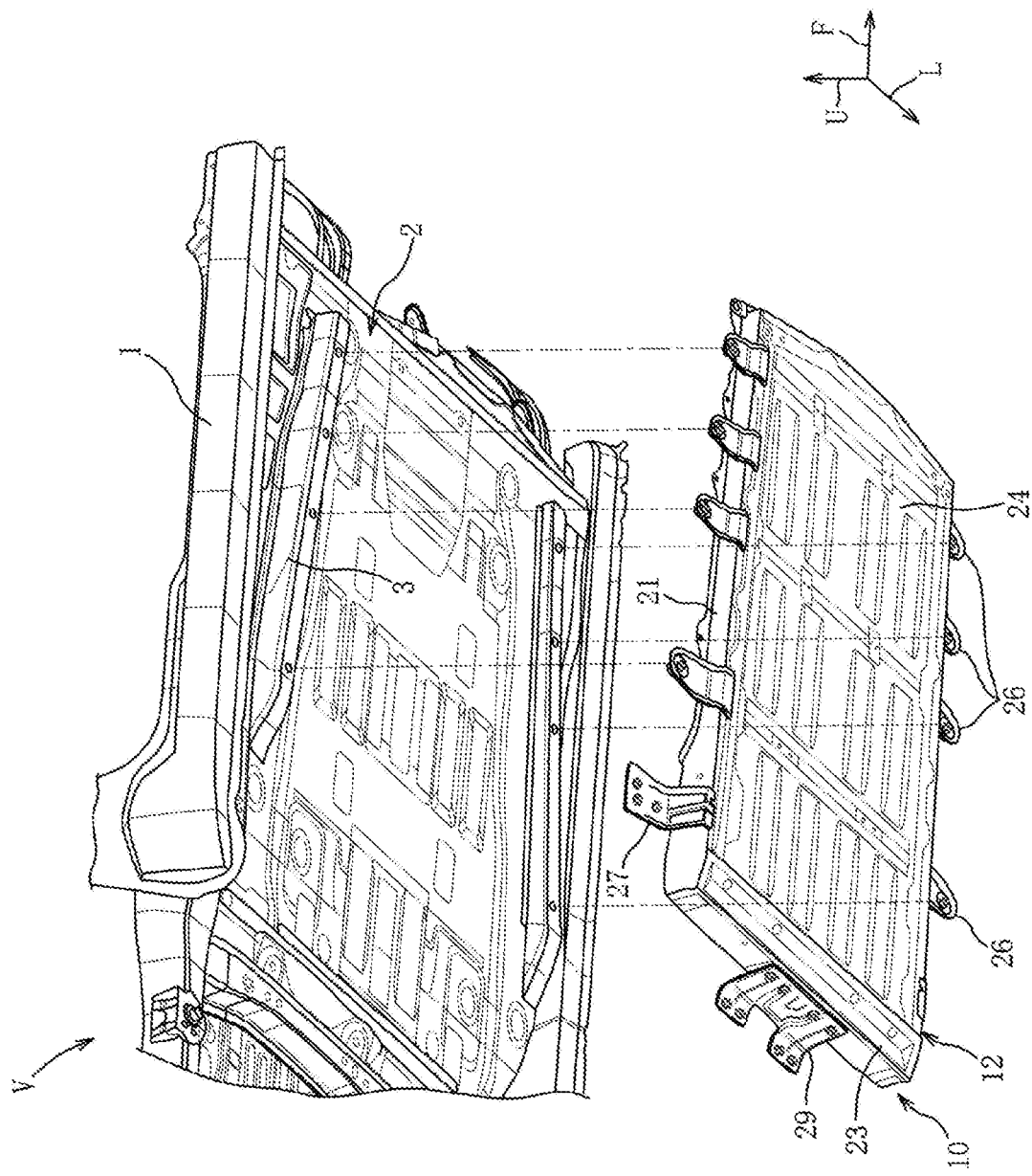
FIG. 2 is a perspective view of the electric vehicle, when viewed from a lower-rear side.

As shown in FIGS. 1 and 2, the vehicle V comprises a pair of right-and-left side sills 1 extending longitudinally, a floor panel 2, a pair of right-and-left floor frames 3 extending longitudinally, a battery unit 10, and others. In the figures, an arrow F shows a forward (front) side in a vehicle longitudinal direction, an arrow L shows a leftward (left) side in a vehicle width direction, and an arrow U shows an upward (upper) side in a vehicle vertical direction. The vehicle V is configured to be substantially symmetrical laterally.

A whole structure of the vehicle V will be described first. The side sill 1 comprises an outer panel which is configured to have a nearly hat-shaped cross section and forms an outside wall portion in the vehicle width direction and an inner panel which is configured to have a nearly hat-shaped cross section and forms an inside wall portion in the vehicle width direction, and these panels jointly form a nearly rectangular-shaped closed-cross section extending longitudinally. A hinge pillar extending vertically is connected to a front-end portion of the side sill 1, and a rear pillar extending vertically is connected to a rear-end portion of the side sill 1. Herein, the vehicle V has a door structure of a so-called double-hinged door type in which a front door is hinged to the hinge pillar at its front end portion and a rear door is hinged to the rear pillar at its rear end portion. Herein, a center pillar is not provided.

Figure 3:
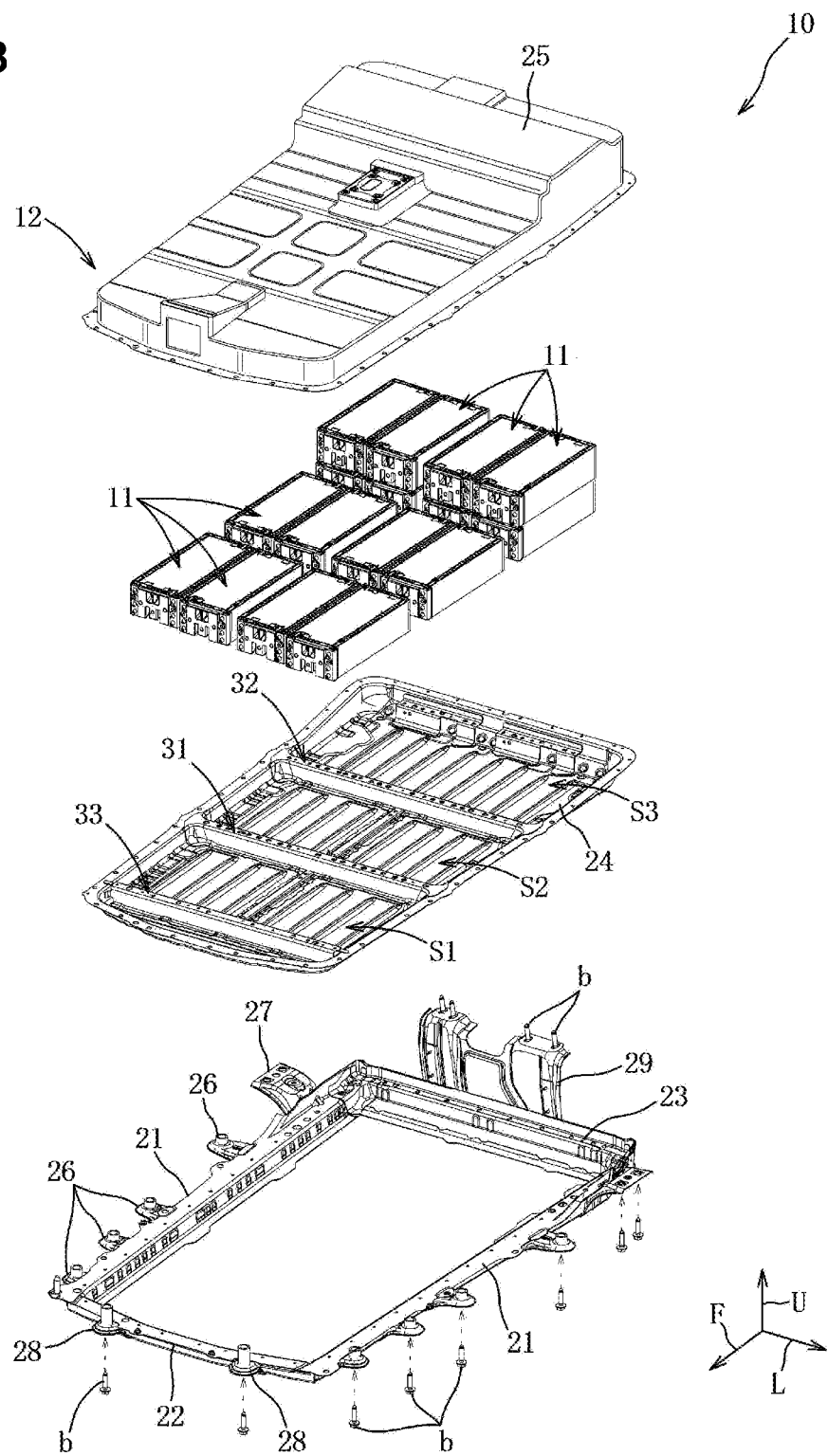
FIG. 3 is an exploded perspective view of a battery unit.

The floor panel 2 is fully flat such that it extends between the pair of side sills 1 and there is not provided a tunnel portion protruding toward an inside of a cabin. As shown in FIGS. 1, 2 and 3, the floor panel 2 comprises a front panel 2a where a seat for a front-seat passenger (not illustrated) is placed and a rear panel 2b where a seat for a rear-seat passenger (not illustrated) is placed. The rear panel 2b is connected to a rear end of the front panel 2a via a kick-up panel 2c which rises obliquely upwardly.

Each of the pair of floor frames 3 is configured to have a nearly hat-shaped cross section, and a distance between the pair of floor frames 3 increases as it goes rearwardly. Therefore, a distance between the side sill 1 and the floor frame 3 adjacent to this side sill 1 becomes closer as it goes rearwardly. The floor frame 3 forms a nearly rectangular-shaped closed-cross section extending longitudinally cooperatively with a lower surface of the floor panel 2a. A rear suspension 4 is arranged in back of the kick-up panel 2c and below the rear panel 2b. The rear suspension 4 is a torsion beam type of suspension which comprises a pair of right-and-left trailing arms 4a which rotatably support wheels (not illustrated) at their rear end portions and a torsion beam 4b which extends laterally and interconnects the pair of trailing arms 4a at both ends, in the vehicle width direction, thereof.

Next, the battery unit 10 will be described. As shown in FIGS. 1-3, the battery unit 10 is arranged in a space below the floor panel 2. The battery unit 10 comprises plural (e.g., sixteen) battery modules 11 and a battery case 12 which stores the battery modules 11. The battery module 11 which supplies a power to an electric motor for vehicle driving is configured as a rectangular-parallelepiped shaped battery assembly in which plural rectangular-parallelepiped shaped battery cells 11a (see FIG. 8) having specification voltage are arranged longitudinally in a layer shape. This battery cell 11a is a lithium ion battery, a kind of a secondary battery, for example. The plural battery modules 11 are formed in a uniform size (longitudinal, lateral, height), and are stored in the battery case 12 in such a manner that each longitudinal direction is parallel to the vehicle longitudinal direction. The weight of the battery module 11 is about 14 kg and the total weight of the battery unit 10 is about 300 kg, for example.

The battery case 12 is configured to secure the vibration resistance as well as the water resistance for a high-voltage battery where the battery modules 11 are connected in series. As shown in FIG. 3, the battery case 12 comprises a pair of right-and-left side frames 21, a front frame 22 which extends laterally and interconnects respective front end portions of the pair of side frames 21, a rear frame 23 which extends laterally and interconnects respective rear end portions of the pair of side frames 21, a tub-shaped battery tray 24 which is supported at the frames 21-23 and forms a bottom portion of the battery case 12, a synthetic-resin made cover member 25 which forms a sealed space for storing the plural battery modules 11 cooperatively with the battery tray 24, and so on. The bending rigidity, in the vertical direction, of the side frame 21 is set to be lower than that of the floor frame 3.

Figure 7:
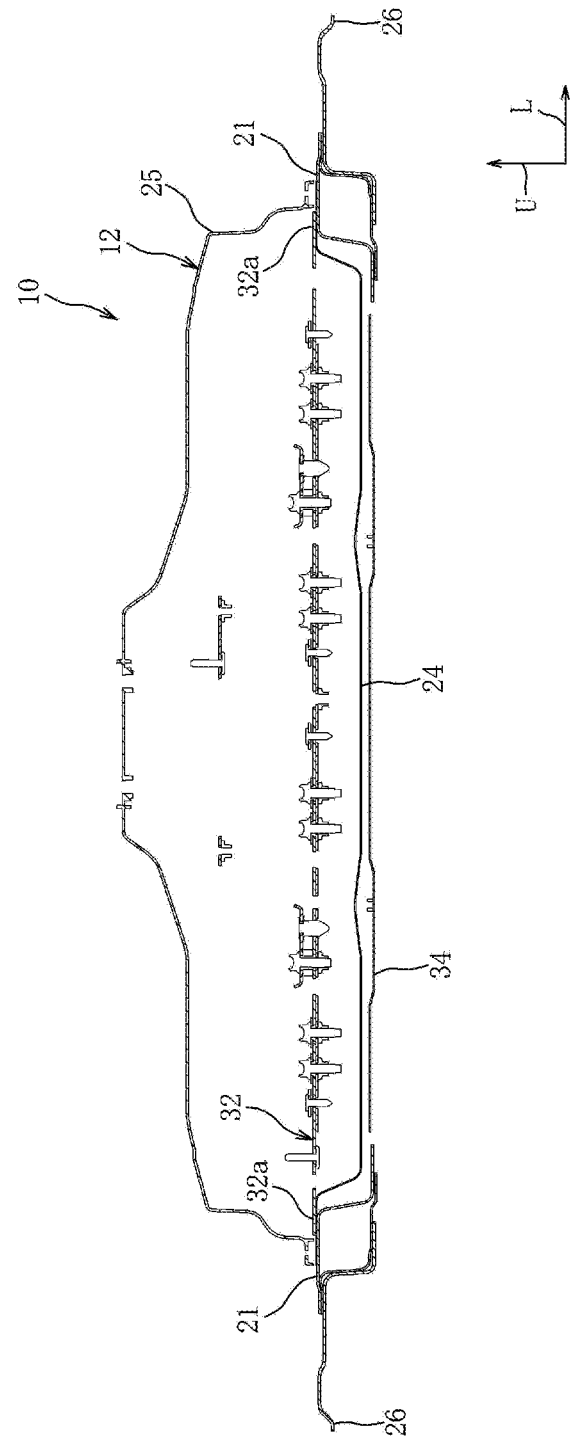
FIG. 7 is a sectional view taken along line VII-VII of FIG. 4.

Each of the frames 21-23 is configured to have a nearly rectangular-shaped closed-cross section which is formed by a lower panel having a nearly L-shaped cross section and an upper panel having a nearly L-shaped cross section (see FIG. 7). The closed-cross sections of the frames 21-23 are continuous in a ring shape such that the frames 21-23 form a ring-shaped closed-cross section structure. The frames 21-23 are attached to the vehicle body by attachment portions 26-29. Four pairs of right-and-left attachment portions 26 and a pair of right-and-left attachment portions 27 extend outwardly, in the vehicle width direction, from the respective lower panels of the pair of side frames 21, respectively. These attachment portions 26, 27 are fixedly fastened to lower wall portions of the floor frames 3 by molts b. A pair of right-and-left attachment portions 28 extend forwardly from the lower panel of the front frame 22, respectively. The attachment portions 28 are fixedly fastened to a lower surface of a front side portion of the front panel 2a by bolts b. The attachment portion 29 extends upwardly from a central portion of the lower panel of the rear frame 23 and its upper end portion is fixedly fastened to a cross member (not illustrated) which forms a closed-cross section extending laterally cooperatively with the rear panel 2b by bolts b.

Figure 4:
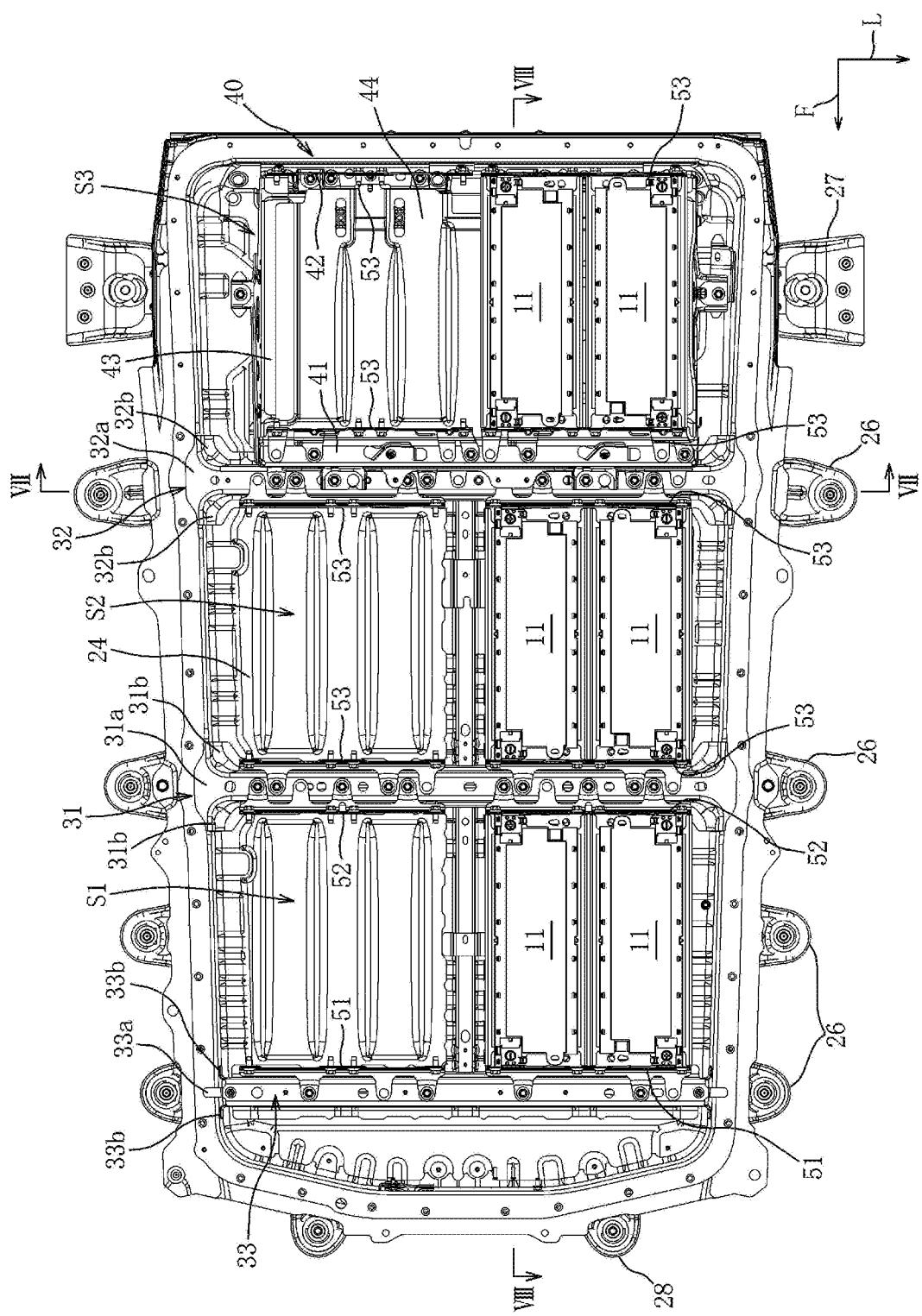
FIG. 4 is a plan view of the battery unit without a cover member and right-side battery modules.
Figure 5:
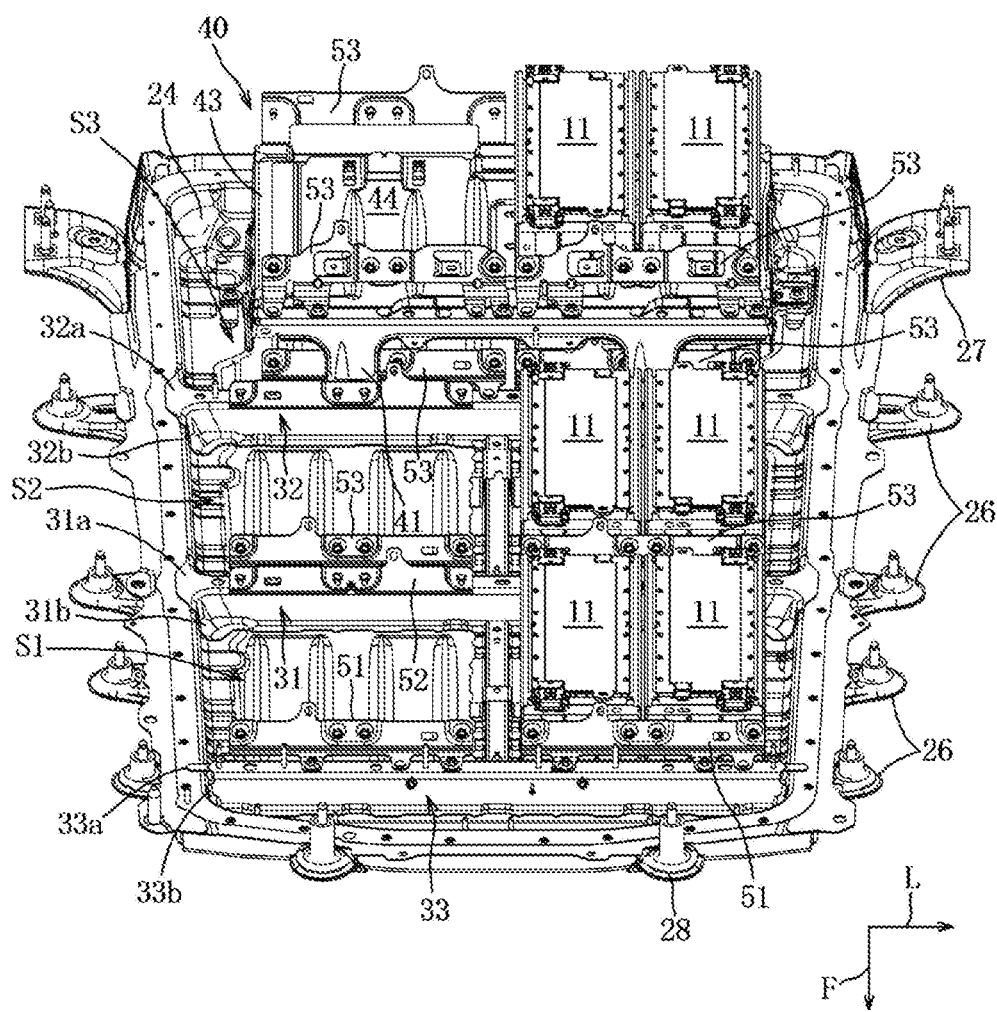
FIG. 5 is a perspective view of the battery unit without the cover member and the right-side battery modules, when viewed from an upper-front side.

As shown in FIGS. 3-5, the battery tray 24 is firmly welded in a state where it is placed on respective upper wall portions of the frames 21-23. Therefore, bending move, in the vertical direction, of the battery tray 24 can be considered to be similar to that of the frames 21-23. A plate-shaped rubber member (not illustrated) is provided between the battery tray 24 and the battery modules 11 via cooling pipes (not illustrated). Thereby, a distance between the battery tray 24 and the battery modules 11 is configured to be changeable.

The battery tray 24 is configured to have first-third storage areas (battery storage areas) S1-S3 storing the battery modules 11 which is partitioned by first-third cross frames 31-33, respectively, having a nearly hat-shaped cross section. The third and first cross frames 33, 31 partition a longitudinal range of the first storage area S1 which corresponds to a lower side of a front part (front seat's passenger) of the floor panel 2a, the first and second cross frames 31, 32 partition a longitudinal range of the second storage area S2 which corresponds to a lower side of a rear part of the floor panel 2a, and the second cross frame 32 and the rear frame 23 partition a longitudinal range of the third storage area S3 which corresponds to a lower side of the kick-up panel 2c and the rear panel 2b. The first and second storage areas S1, S2 respectively store the four battery modules 11 such that these battery modules 11 are aligned laterally in a single-layer state.

Figure 6:
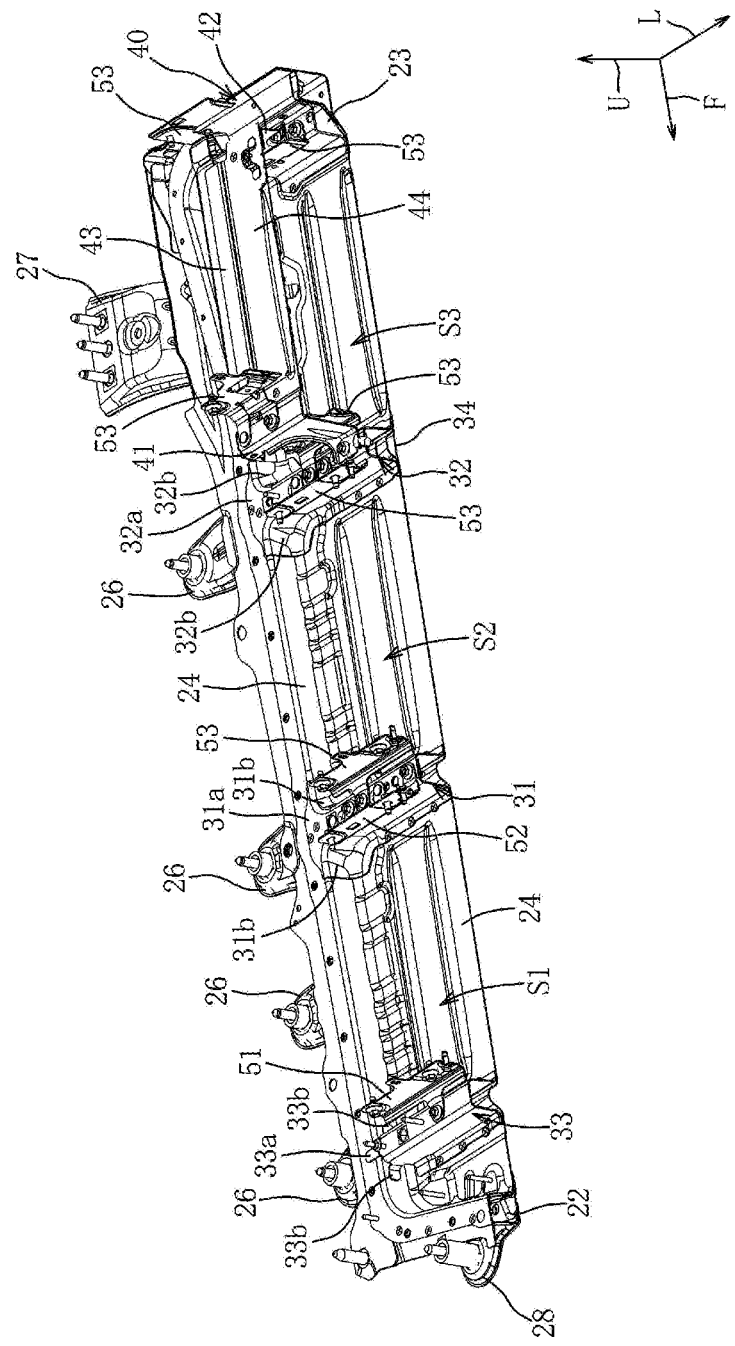
FIG. 6 is a perspective sectional view of a major part of FIG. 4.

The third storage area S3 has a two-stage supporting mechanism 40. That is, this third storage area S3 stores the eight battery modules 11 such that the lower-side four battery modules 11 are aligned laterally and the upper-side four battery modules 11 are aligned laterally above the lower-side four battery modules 11. As shown in FIGS. 4-6, the two-stage supporting mechanism 40 comprises a nearly π-shaped front support portion 41, a nearly 7C-shaped rear support portion 42, a pair of right-and-left nearly T-shaped side support portions 43 which interconnect respective right-and-left end portions of the front support portion 41 and the rear support portion 42, a bottom-plate member 44 which extends over the support portions 41-43, and others, which supports the upper-side four battery modules 11. A pair of right-and-left leg parts of the front support portion 41 are fixedly fastened to the upper wall portion of the second cross frame 32, and a pair of right-and-left leg parts of the rear support portion 42 are fixedly fastened to the upper wall portion of the rear frame 23. Leg parts of the pair of side support portions 43 are fixedly fastened to onto the battery tray 24.

Each of the first-third cross frames 31-33 forms a closed-cross section extending laterally above the battery tray 24 cooperatively with the battery tray 24. These first-third cross frames 31-33 are configured to have substantially the same bending rigidity, in the vertical direction, as the side frame 21, and arranged in the longitudinal direction substantially regular intervals.

As shown in FIGS. 4-6, the first cross frame 31 comprises upper-wall connection portions 31a which respectively extend outwardly, in the vehicle width direction, from right-and-left both end portions of its upper wall portion and a pair of front-and-rear side-wall connection portions 31b which respectively extend forwardly and rearwardly from respective right-and-left both end portions of its front wall portion and its rear wall portion. The upper-wall connection portion 31a is connected to the upper wall portion of the side frame 21, and the pair of side-wall connection portions 31b are connected to an inside wall portion of the side frame 21, respectively. The upper-wall connection portion 31a and the pair of side-wall connection portion 31b are formed integrally. The third cross frame 33 comprises upper-wall connection portions 33a which respectively extend outwardly, in the vehicle width direction, from right-and-left both end portions of its upper wall portion and a pair of front-and-rear side-wall connection portions 33b which respectively extend forwardly and rearwardly from respective right-and-left both end portions of its front wall portion and its rear wall portion. The upper-wall connection portion 33a is connected to the upper wall portion of the side frame 21, and the pair of side-wall connection portions 33b are connected to an inside wall portion of the side frame 21, respectively. The upper-wall connection portion 33a and the pair of side-wall connection portion 33b are formed separately.

The second cross frame 32 comprises upper-wall connection portions 32a which respectively extend outwardly, in the vehicle width direction, from right-and-left both end portions of its upper wall portion and a pair of front-and-rear side-wall connection portions 32b which respectively extend forwardly and rearwardly from respective right-and-left both end portions of its front wall portion and its rear wall portion. The upper-wall connection portion 32a is connected to the upper wall portion of the side frame 21, and the pair of side-wall connection portions 32b are connected to an inside wall portion of the side frame 21, respectively. The upper-wall connection portion 32a and the pair of side-wall connection portion 32b are formed integrally. As shown in FIGS. 1, 6-8, a lower-side cross frame 34 extending laterally is provided at a lower surface of the battery tray 24. The lower-side cross frame 34 forms a closed-cross section extending laterally cooperatively with the battery tray 24 below the battery tray 24. The closed-cross section formed by the lower-side cross frame 34 is positioned vertically adjacently to the closed-cross section formed by the second cross frame 32, interposing the battery tray 24.

The battery modules 11 are mounted at the first-third cross frames 31-33 and the rear frame 23 by a pair of front-and-rear metal-plate made mounting brackets 51-53. The bending rigidity, in the vertical direction, of the mounting brackets 51-53 are set to be higher than that of the battery tray 24 and be lower than that of the first-third cross frames 31-33.

Figure 8:
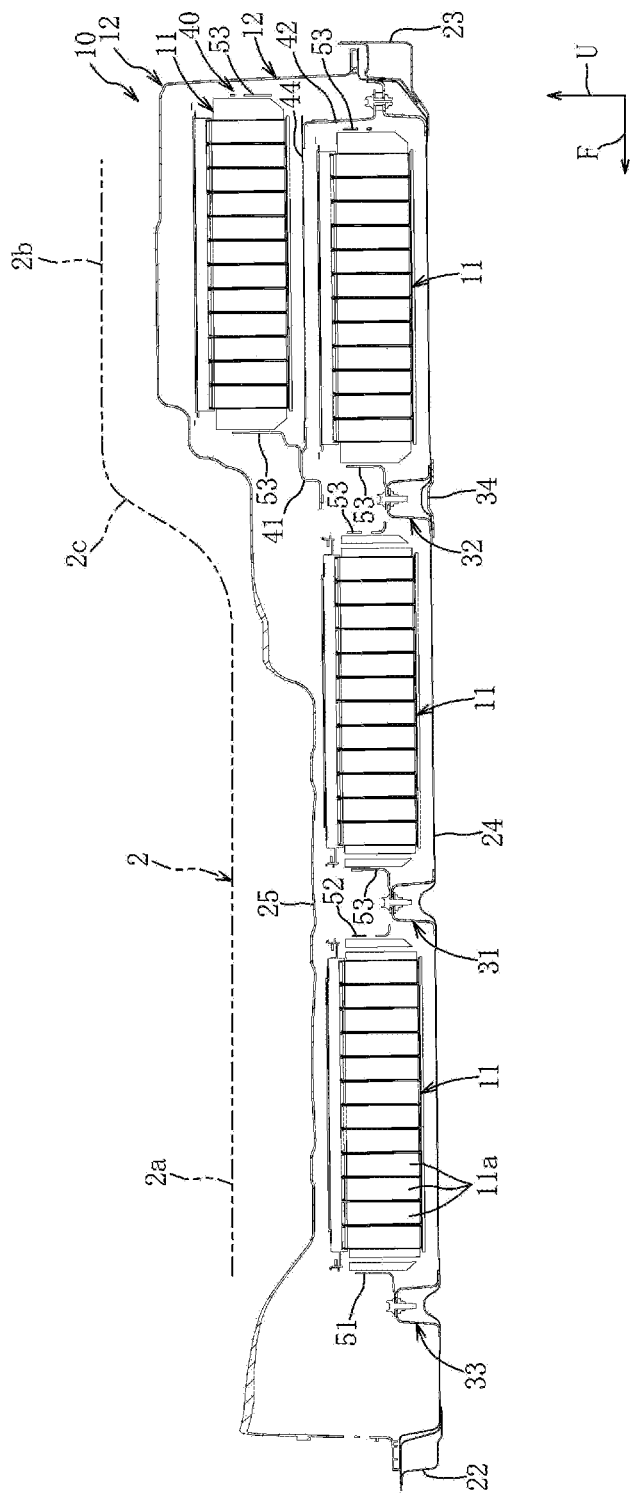
FIG. 8 is a sectional view taken along line VIII-VIII of FIG. 4.
Figure 9A:
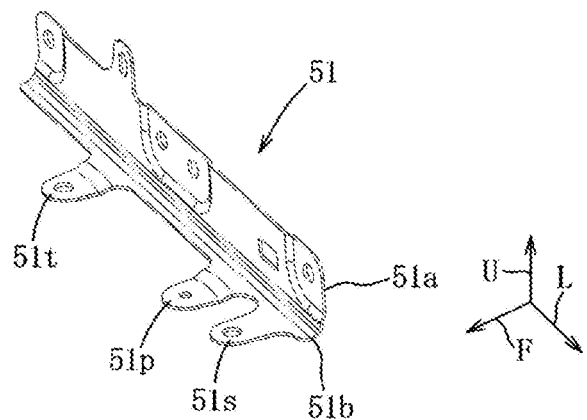
FIGS. 9A, 9B and 9C are perspective views of first-third mounting brackets.
Figure 9B:
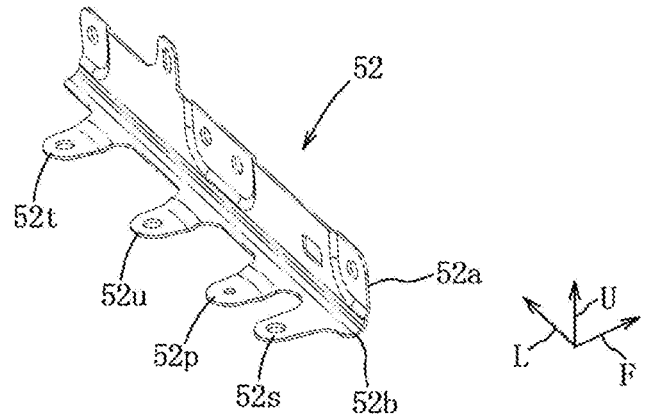
Figure 9C:
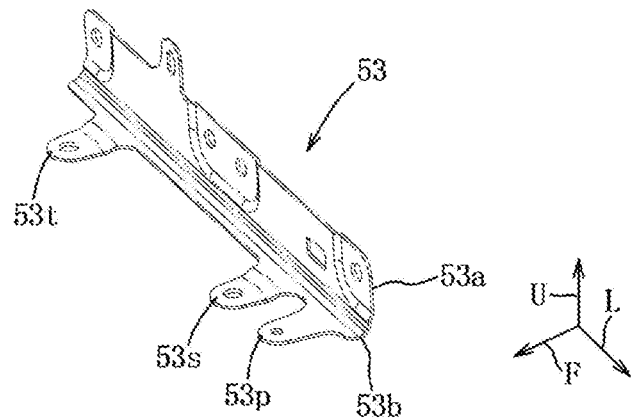

As shown in FIGS. 9A-9C, the mounting brackets 51-53 comprise connecting wall portions 51a-53a which extend vertically and are connected to the battery modules 11 and fixing wall portions 51b-53b which extend longitudinally and are connected by fastening members, and are configured to have a nearly L-shaped cross section. The connecting wall portions 51a, 53a of the mounting brackets which are mounted at a front side of the battery modules 11 are connected to front wall portions of the two laterally-adjacent battery modules 11 by four bolts, and the connecting wall portions 52a, 53a of the mounting brackets which are mounted at a rear side of the battery modules 11 are connected to rear wall portions of the two laterally-adjacent battery modules 11 by four bolts. Further, as shown in FIG. 8, the connecting wall portions 51a-53a of the mounting brackets are connected to the battery modules 11 such that a center of gravity of each of the battery modules 11 is located substantially at the same level as each of the upper wall portions of the first-third cross frames 31-33 and the rear frame 23.

The right-and-left first mounting brackets 51 fixed to the third cross frame 33 and the right-and-left second mounting brackets 52 fixed to the first cross frame 31 are provided in the first storage area S1. As shown in FIG. 9A, the first mounting bracket 51 is made by pressing 1.6 mm steel plate, for example, and comprises the connecting wall portion 51a and the fixing wall portion 51b. The fixing wall portion 51b is provided with a fastening portion 51s which extends forwardly (in an opposite direction to a bending part) at its left-side end portion. Further, a poisoning portion 51p extending forwardly is formed at a portion of the fixing wall portion 51b which is located between a central part of the fixing wall portion 51b and a left-side end part of the fixing wall portion 51b and also slightly closer to the central part of the fixing wall portion 51b, and a fastening portion 51t extending forwardly is formed at another portion of the fixing wall portion 51b which is located at a symmetrical position to the positioning portion 51p relative to the central part of the fixing wall portion 51b.

The fixing wall portion 51b extends forwardly from the bending part, and the fastening portion 51s and the fastening portion 51t are fixed to the upper wall portion of the third cross frame 33 by bolts. The connecting wall portion 51a is supported in a cantilever state such that it protrudes from the upper wall portion of the third cross frame 33. Herein, positioning of the left-side first mounting bracket 51 which corresponds to a lower side of a assistant driver's seat is conducted by the fastening portion 51s provided on the outward side in the vehicle width direction, and fastening fixation of that is conducted by the positioning portion 51p provided on the inward side in the vehicle width direction (see FIG. 4).

As shown in FIG. 9B, the second mounting bracket 52 is made by pressing 1.6 mm steel plate, for example, and comprises the connecting wall portion 52a and the fixing wall portion 52b. The fixing wall portion 52b is provided with a fastening portion 52s which extends rearwardly at its right-side end portion. Further, a fastening portion 52t extending rearwardly is formed at its left-side end portion, a fastening portion 52u extending rearwardly is formed at a central part of the fixing wall portion 52b, and a positioning portion 52p extending rearwardly is formed at a central position between the fastening portion 52s and the fastening portion 52u. The fixing wall portion 52b extends rearwardly from a bending part, and the fastening portion 52s, the fastening portion 52t, and the fastening portion 52u are fixed to the upper wall portion of the first cross frame 31 by bolts. The connecting wall portion 52a is supported in a cantilever state such that it protrudes from the upper wall portion of the first cross frame 31.

The right-and-left third mounting brackets 53 fixed to the first cross frame 31 and the right-and-left third mounting brackets 53 fixed to the second cross frame 32 are provided in the second storage area S2. As shown in FIG. 9C, the third mounting bracket 53 fixed to the first cross frame 31 is made by pressing 2.0 mm steel plate, for example, and comprises the connecting wall portion 53a and the fixing wall portion 53b. The fixing wall portion 53b is provided with a positioning portion 53p which extends forwardly at its left-side end portion. Further, a fastening portion 53s extending forwardly is formed at a portion of the fixing wall portion 53b which is located between a central part of the fixing wall portion 53b and a left-side end part of the fixing wall portion 53b, and a fastening portion 53t extending forwardly is formed at a right-side end part of the fixing wall portion 53b.

The fixing wall portion 53b extends forwardly from a bending part and is fixed to the upper wall portion of the first cross frame 31 by bolts. The connecting wall portion 53a is supported in a cantilever state such that it protrudes from the upper wall portion of the first cross frame 31. The left-side third mounting bracket 53 fixed to the first cross frame 31 in the cantilever state and the pair of right-and-left third mounting brackets 53 fixed to the second cross frame 32 in the cantilever state are configured similarly except an arrangement position thereof.

The pair of right-and-left third mounting brackets 53 fixed to the second cross frame 32 in the cantilever state and the pair of right-and-left third mounting brackets 53 fixed to the rear frame 23 in the cantilever state are arranged at a lower stage of the third storage area S3 similarly to the second storage area S2. Further, at an upper stage of the third storage area S3 are arranged the pair of right-and-left third mounting brackets 53 fixed to the front support portion 41 in the cantilever state and the pair of right-and-left third mounting brackets 53 fixed to the rear support portion 42 in the cantilever state similarly to the lower stage of the third storage area S3. The first-third mounting brackets 51-53 are designed substantially similarly expect a plate thickness, a position of the fastening portion, and a position of the positioning thereof.

Herein, a relationship between the frame rigidity and the module support rigidity will be described regarding the traveling noises. The inventors of the present invention prepared the evaluation model related to the battery case 12 of the present vehicle V and conducted the CAE analysis of the traveling noises for the standard noise level by changing a rigidity ratio of the frame rigidity and the module support rigidity.

Figure 10A:
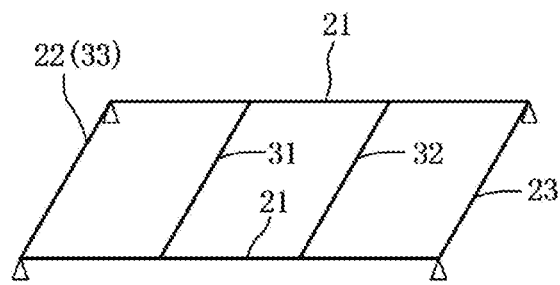
FIGS. 10A and 10B are explanatory diagrams of an evaluation model and frame rigidity.
Figure 10B:

As shown in FIG. 10A, the evaluation model of this analysis was configured such that respective lower-side four corners of the front end portion and the rear end portion of the pair of side frames 21 were supported. As shown by an arrow in FIG. 10B, a specified measuring load was applied to a position having the maximum vibration amplitude of the side frame 21 from above in order to measure the frame rigidity. Herein, the frame rigidity is defined as the bending rigidity (N/mm), in the vertical direction, of the side frame 21 which shows substantially the same move as the floor frame 3. Meanwhile, since the two-stage supporting mechanism 40 having the high rigidity which stores the eight battery modules 11 with two layers is arranged in the third storage area S3, this third storage area S3 has the higher rigidity than the first and second storage areas S1, S2 which store the eight battery modules with a single layer and two rows. Accordingly, in this evaluation model, a middle point of the first and second storage areas S1, S2 (a connection point of the side frame 21 and the first cross frame 31) which greatly affects the traveling noises of the vehicle V corresponds to the position having the maximum vibration amplitude of the side frame 21.

Figure 11A:
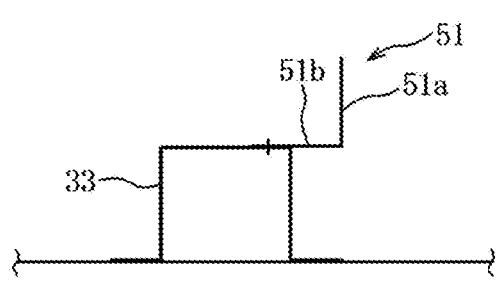
FIGS. 11A and 11B are explanatory diagrams of module support rigidity.
Figure 11B:
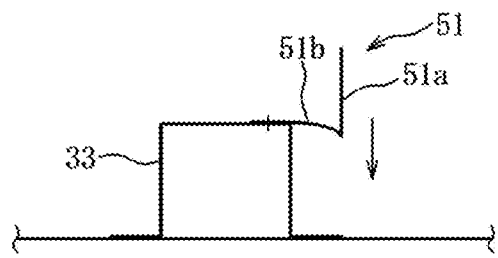

The module support rigidity is defined as the bending rigidity (N/mm), in the vertical direction, of the mounting bracket 51. In the first and second storage areas S1, S2, the eight battery modules 11 are supported at the first-third cross frames 31-33 via the mounting brackets 51-53 in the single-layer state. Since the first-third cross frames 31-33 have the higher rigidity than the mounting brackets 51-53, the module support rigidity can be considered as the bending rigidity, in the vertical direction, of the mounting bracket 51. As shown in FIG. 11, since the connecting wall portion 51*a* connected to the mounting bracket 51 is supported in the cantilever state such that it protrudes from the upper wall portion of the third cross frame 33, the bending rigidity, in the vertical direction, of the mounting bracket 51, i.e., the module support rigidity, can be obtained by using the amount of displacement, in the vertical direction, of the connecting wall portion 51*a* as shown in FIG. 11B. Herein, the mounting brackets 52, 53 are the same as this.

Figure 12:
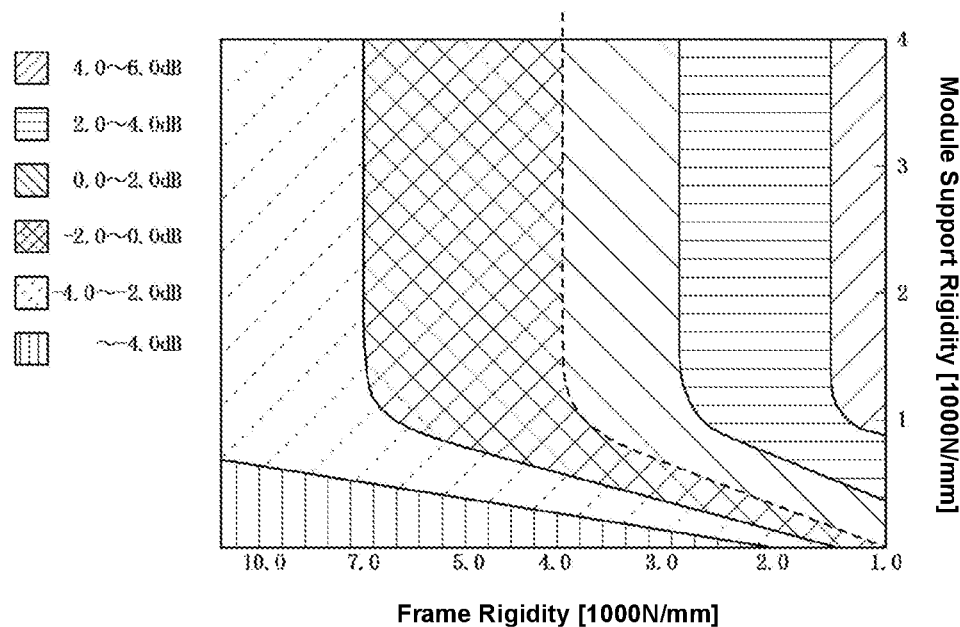
FIG. 12 is a graph showing a relationship between the frame rigidity and the module support rigidity.

The analysis results are shown in FIG. 12. The lateral axis denotes the frame rigidity, and the vertical axis denotes the module support rigidity. As apparent from FIG. 12, it was found that a boundary line of an area where the noise performance was superior (the noise level was lower than the standard noise level) and an area where the noise performance was inferior (the noise level was higher than the standard noise level) showed a liner-function characteristic in a range where the module support rigidity was nearly lower than 1000 N/mm, and the noise performance deteriorated in a range where the frame rigidity was higher than the boundary line of about 4000 N/mm. That is, it was confirmed that while the noise level was more improved as the frame rigidity becomes higher, because an increase of the plate thickness of the side frame 21 might cause a problem of weight increase of the vehicle body, the traveling noises could be made superior, without increasing the vehicle-body weight, by adjusting the respective rigidities in a range where the frame rigidity was about 4000 N/mm or smaller and the module support rigidity was about 1000 N/mm or smaller, in other words, in the range where the frame rigidity was about 4000 N/mm or smaller and the module support rigidity (the bending rigidity, in the vertical direction, of the mounting bracket 51) was 25% of the frame rigidity (the bending rigidity, in the vertical direction, of the side frame 21) or smaller.

Figure 13:
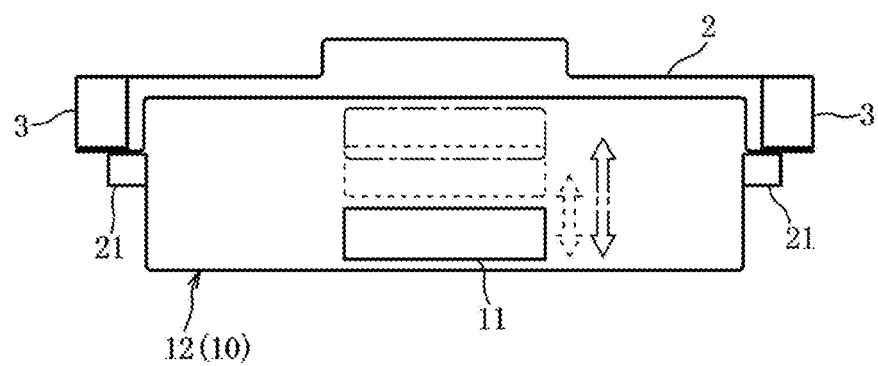
FIG. 13 is an explanatory diagram of a module supporting mechanism.

That is, in a case where the module support rigidity is high, as shown by a broken line in FIG. 13, the vertical move of the battery module 11 and the vertical move of the side frame 21 resonate, so that the drumming noise or the like cause the traveling noises. Meanwhile, in a case where the module support rigidity is 25% of the frame rigidity or smaller, as shown by a one-dotted broken line, the move amount (vibration cycle) of the battery module 11 becomes large, independently from the move amount of the side frame, and constitutes a so-called double vibration-proof (double spring) mechanism. Thereby, the resonance of the vertical move of the battery module 11 and the vertical move of the third cross frame 33 can be avoided. The resonance, in the vertical direction, of the vehicle body and the battery unit 10 is suppressed by making the move of the battery module 11 have the directivity (the vertical move is allowed and also the lateral move is restricted) by means of separation of the vertical move of the third cross frame 33 (the battery tray 24) connected to the side frame 21 and the vertical move of the battery module 11. In the present embodiment, the low-frequency sound of 20-50 Hz is considered as the drumming noise and the middle-frequency sound of 100-400 Hz is conceded as the road noise.

As described above, since the fixing wall portions 51*b*-53*b* of the mounting brackets 51-53 are provided to extend in an opposite direction to the battery modules 11 and fixed at the respective fastening portions provided to extend from the fixing wall portions 51*b*-53*b* in an opposite direction to the bending portion, only the vertical moves of the mounting brackets 51-53 with the support points of the respective fastening portions are allowed. Accordingly, the module support rigidity which comprises the bending rigidity, in the vertical direction, of the cross frames and the bending rigidity, in the vertical direction, of the mounting brackets is set be 25% of the bending rigidity, in the vertical direction, of the side frames 21 or smaller, without any necessity of decreasing of the bending rigidity, in the vertical direction, of the cross frames 31-33.

In the present embodiment, regarding the module support rigidity comprised of the third cross frame 33 and the first mounting bracket 51, the module support rigidity comprised of the first cross frame 31 and the second mounting bracelet 52, the module support rigidity comprised of the first cross frame 31 and the third mounting bracket 53, and the module support rigidity comprised of the second cross frame 31 and the third mounting bracket 53, each bending rigidity, in the vertical direction, thereof is set to be 25% of the bending rigidity, in the vertical direction, of the side frame 21 or smaller. Herein, the traveling-noises' countermeasure can be attained by setting the module support rigidity of the mounting brackets 51-53 at 25% of the frame rigidity or smaller. However, in order to ensure the support performance of the battery modules 11 as a main performance of the mounting brackets 51-53, specified module support rigidity (e.g., 10% of the frame rigidity or larger) is secured.

Hereafter, the function/effects of the above-described battery unit mounting structure will be described. The simulation analysis by the CAE (Computer Aided Engineering) was conducted. A vehicle model A (evaluation standard model) where the battery unit was not mounted and a vehicle model C according to the present embodiment were prepared, and respective vehicle-body vibrations of the models A, C at each frequency band were calculated. Herein, the vehicle model A and the vehicle model C were designed substantially similarly except the battery unit. Further, the ERP (Equivalent Radiation Energy) corresponding to the radiated sound power was calculated from the displacement of each node of the respective models as the evaluation index of the vehicle-body vibration.

Figure 14:
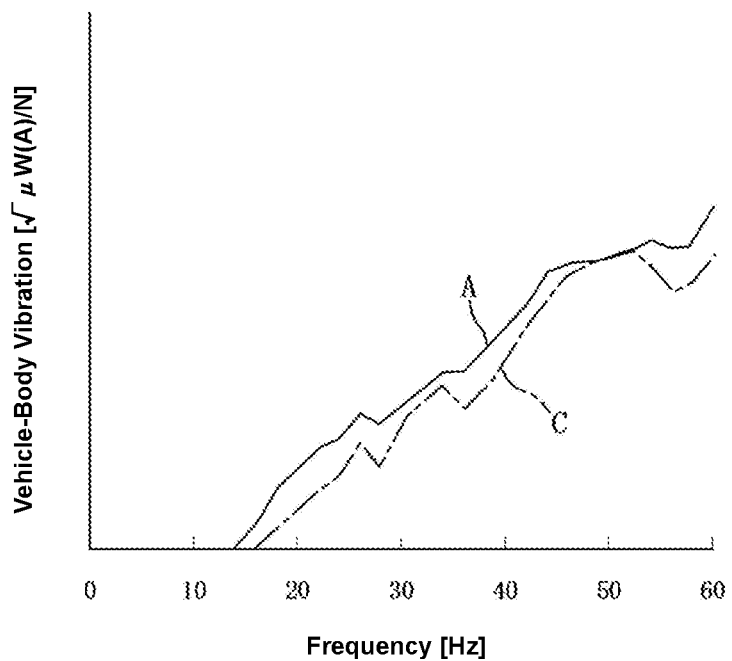
FIG. 14 shows analysis results related to vehicle-body vibrations of a model of the present embodiment and an evaluation standard model.
Figure 15:
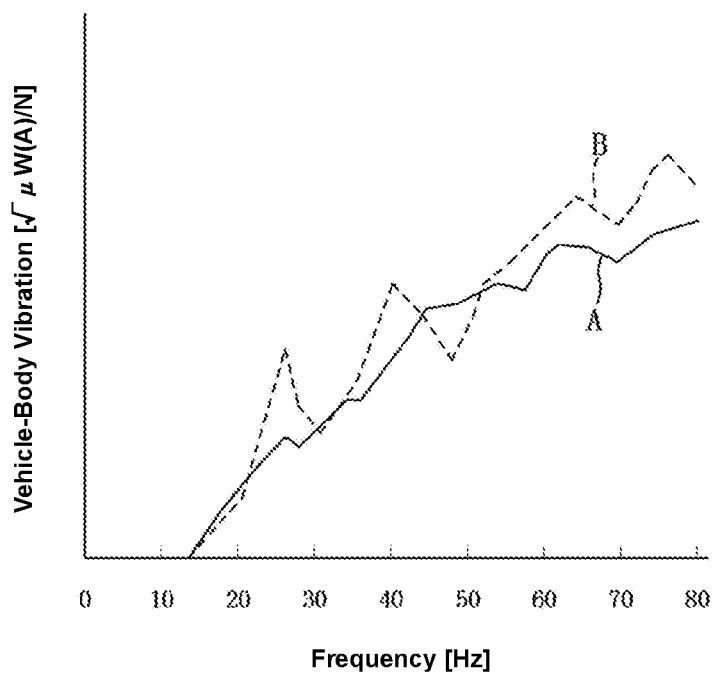
FIG. 15 shows analysis results related to the vehicle-body vibrations of a conventional model and the evaluation standard model.

FIG. 14 shows the analysis results. A lateral axis denotes the frequency and a vertical axis denotes the vehicle-body vibration in FIG. 14. As show in FIG. 14, it was found that the model C shown by a one-dotted broken line had the lower vehicle-body vibration than the model A shown by a solid line in a low-frequency area. In particular, the model C could suppress the vehicle-body vibration in a frequency band around 40 Hz which may cause the drumming noise, so that the model C improved the drumming-noise performance greatly.

According to battery unit mounting structure of the above-described present embodiment, since the battery unit 10 comprises the battery modules 11, the pair of right-and-left side frames 21 mounted at the pair of floor frames 3, and the pair of front-and-rear module supporting mechanisms which comprise the pair of front-and-rear cross frames 33, 31 respectively extending in the vehicle width direction and interconnecting the pair of side frames 21 and the pair of front-and-rear mounting brackets 51, 52 supporting the front end portion and the rear end portion of the battery modules 11, the battery modules 11 can be firmly connected to the vehicle-body-side floor frames 3 via the side frames 21. Further, since the bending rigidity, in the vertical direction, of the module supporting mechanism comprising the third cross frame 33 and the first mounting bracket 51 is set to be lower than that of the side frame 21, the vertical move of the side frame 21 and the vertical move of the battery module 11 can be separated from each other by using the double vibration-proof mechanism, so that the resonance, in the vertical direction, of the vehicle body and the battery unit 10 can be suppressed.

Since the bending rigidity, in the vertical direction, of the cross frame 33 is set to be lower than that of the floor frame 3 and the bending rigidity, in the vertical direction, of the module supporting mechanism comprising the cross frame 33 and the first mounting bracket 51 is set to be 25% of the bending rigidity, in the vertical direction, of the side frame 21 or lower, the weight reduction and improvement of the vibration characteristic (performance) can be compatibly achieved.

Since the module supporting mechanism comprises the first mounting bracket 51 to mount the battery module 11 at the third cross frame 33 vertically movably, and the bending rigidity, in the vertical direction, of the first mounting bracket 51 is set to be lower than that of the third cross frame 33, the bending rigidity, in the vertical direction, of the module supporting mechanism can be set to be lower than that of the side frame 21, without decreasing the rigidity of the third cross frame 33.

Since the first mounting bracket 51 comprises the connecting wall portion 51a extending in the vertical direction and connected to the battery module 11 and the fixing wall portion 51b extending in the opposite direction to the battery module 11 from the lower end part of the connecting wall portion 51a and fixed to the upper wall portion of the third cross frame 33, and the fixing wall portion 51b of the mounting bracket 51 is configured to protrude toward the battery module 11 from the upper wall portion of the third cross frame, the vertical move of the third cross frame 33 and the vertical move of the battery module 11 can be separated from each other, synchronizing the move, in the vehicle width direction, of the third cross frame 33 and the move, in the vehicle width direction, of the battery module 11 with a simple structure.

Since the battery unit 10 comprises the battery tray 24 which is supported at the side frame 21 and forms the bottom portion of the battery unit 10, the battery module 11 can be mounted at the battery tray 24 vertically movably.

Next, some modifications where the above-described embodiment is partially modified will be described.

1] While the above-described embodiment described a case where the battery case 12 which were provided with the first-third storage areas S1-S3 and the first-third cross frames 31-33, the battery case 12 may be provided with a single storage area and a single cross frame as long as the battery module 11 is configured to have the directivity (its vertical move is allowed and its lateral move is restricted).

2] While the above-described embodiment described a case where three kinds of first-third mounting brackets 51-53 were provided, a single mounting bracket may be provided. Further, while a case where a pair of right-and-left mounting brackets were provided at the cross frames was described, a single or three or more mounting brackets may be provided at a single cross frame, or a single or three or more battery modules may be mounted at a single mounting bracket.

3] While the above-described embodiment described a case where the module support mechanism comprised the two members of the cross frame and the mounting bracket 51, the module support mechanism may comprise a single member.

4] While the above-described embodiment described a case where regarding the module support rigidity comprised of the third cross frame 33 and the first mounting bracket 51, the module support rigidity comprised of the first cross frame 31 and the second mounting bracelet 52, the module support rigidity comprised of the first cross frame 31 and the third mounting bracket 53, and the module support rigidity comprised of the second cross frame 31 and the third mounting bracket 53, each bending rigidity, in the vertical direction, thereof was set to be 25% of the bending rigidity, in the vertical direction, of the side frame 21 or smaller, at least one of the above-described module support rigidities may be set to be 25% of the bending rigidity, in the vertical direction, of the side frame 21 or smaller. It is preferable that the module support rigidity corresponding to the front side and the rear side of the battery module 11 stored at a specified storage portion be set at 25% of the bending rigidity, in the vertical direction, of the side frame 21 or smaller.

5] While the above-described embodiment described a case where the first-third cross frames 31-33 were made of the high-rigidity member and the module support rigidity was configured to have the bending rigidity, in the vertical direction, of the mounting brackets 51-53 in an elevational view, the mounting brackets 51-53 may be omitted by making these brackets be integrated with the first-third cross frames 31-33. For example, the front-and-rear end portions of the battery module 11 are mounted directly on the first-third cross frames 31-33, and the first-third cross frames 31-33 are provided with a fragile portion (e.g., a slit), respectively, so that the battery module 11 mounted at the first-third cross frames 31-33 can be vertically displaced (i.e., vertically movable). Thereby, the vertical move of the side frame 21 and the vertical move of the battery module 11 can be separated from each other.

6] The present invention should not be limited to the above-described embodiment and modifications and any other improvements may be applied within the scope of a spirit of the present invention.

What is claimed is:

1. A battery unit mounting structure of an electric vehicle, comprising:
    a floor panel;
    a pair of right-and-left floor frames provided below the floor panel, each of which forms a closed-cross section extending longitudinally cooperatively with the floor panel; and
    a battery unit supporting a battery module and mounted at the pair of floor frames,
    wherein said battery unit comprises the battery module, a pair of right-and-left side frames mounted at said pair of floor frames, and a pair of front-and-rear module supporting mechanisms which include a pair of front-and-rear cross frames respectively extending in a vehicle width direction and interconnecting said pair of side frames and support a front end portion and a rear end portion of said battery module, and
    bending rigidity, in a vertical direction, of said module supporting mechanisms is set to be lower than that of said side frames.

2. The battery unit mounting structure of the electric vehicle of claim 1, wherein bending rigidity, in the vertical direction, of said cross frame is set to be lower than that of said floor frame, and said bending rigidity, in the vertical direction, of the module supporting mechanism is set to be 25% of said bending rigidity, in the vertical direction, of the side frame or lower.

3. The battery unit mounting structure of the electric vehicle of claim 1, wherein said module supporting mechanism comprises a mounting bracket to mount said battery module at said cross frame vertically movably, and bending rigidity, in the vertical direction, of said mounting bracket is set to be lower than that of the cross frame.

4. The battery unit mounting structure of the electric vehicle of claim 3, wherein said mounting bracket comprises a connecting wall portion extending in the vertical direction and connected to said battery module and a fixing wall portion extending in an opposite direction to the battery module from a lower end part of said connecting wall portion and fixed to an upper wall portion of said cross frame, and said fixing wall portion of the mounting bracket is configured to protrude toward the battery module from the upper wall portion of the cross frame.

5. The battery unit mounting structure of the electric vehicle of claim 3, wherein said battery unit comprises a battery tray which is supported at said side frame and forms a bottom portion of the battery unit.

* * * * *